United States Patent
Kallan

(10) Patent No.: US 10,324,922 B2
(45) Date of Patent: Jun. 18, 2019

(54) PROVIDING A TIMELINE OF EVENTS REGARDING A DATABASE RECORD

(71) Applicant: salesforce.com, inc., San Francisco, CA (US)

(72) Inventor: Daron Martin Kallan, New York, NY (US)

(73) Assignee: salesforce.com, inc., San Francisco, CA (US)

( * ) Notice: Subject to any disclaimer, the term of this patent is extended or adjusted under 35 U.S.C. 154(b) by 736 days.

(21) Appl. No.: 14/482,691

(22) Filed: Sep. 10, 2014

(65) Prior Publication Data

US 2015/0227518 A1    Aug. 13, 2015

Related U.S. Application Data

(60) Provisional application No. 61/939,467, filed on Feb. 13, 2014.

(51) Int. Cl.
  *G06F 16/00* (2019.01)
  *G06F 16/23* (2019.01)

(52) U.S. Cl.
  CPC .............................. *G06F 16/2358* (2019.01)

(58) Field of Classification Search
  CPC ......... G06F 17/30867; G06F 17/30368; G06F 17/3053; G06F 16/2358
  USPC .................. 707/725, 732; 717/125
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Monica M Pyo

(74) *Attorney, Agent, or Firm* — Weaver Austin Villeneuve & Sampson LLP

(57) ABSTRACT

Disclosed are methods, apparatus, systems, and computer program products for providing a timeline of events regarding a database record in an on-demand database service. In some non-limiting examples, the database record can be stored in a database in a cloud computing environment, and the timeline can display events or interactions related to the database record. Metadata associated with an event or interaction can be used to identify data associated with the event or interaction, and metadata can be used to determine what events or interactions are displayed in the timeline according to filtering parameters. Metadata can also be used to determine a customer satisfaction rating or health-based numeric for the database record.

16 Claims, 10 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0267725 A1* | 12/2005 | Reeder ................. G06F 9/4443 703/22 |
| 2008/0249972 A1 | 10/2008 | Dillon |
| 2009/0063415 A1 | 3/2009 | Chatfield et al. |

(56) References Cited

U.S. PATENT DOCUMENTS

| | | |
|---|---|---|
| 2009/0100342 A1 | 4/2009 | Jakobson |
| 2009/0177744 A1 | 7/2009 | Marlow et al. |
| 2011/0050423 A1* | 3/2011 | Cova ................. G06Q 10/08 340/572.1 |
| 2011/0202866 A1* | 8/2011 | Huang ............... G06F 3/0482 715/779 |
| 2011/0218958 A1 | 9/2011 | Warshavsky et al. |
| 2011/0247051 A1 | 10/2011 | Bulumulla et al. |
| 2011/0258603 A1* | 10/2011 | Wisnovsky ......... G06F 11/3612 717/125 |
| 2012/0042218 A1 | 2/2012 | Cinarkaya et al. |
| 2012/0185476 A1* | 7/2012 | Ullman ............. G06Q 30/0625 707/732 |
| 2012/0202866 A1* | 8/2012 | Dugger, III ........ A61K 31/4178 514/397 |
| 2012/0233137 A1 | 9/2012 | Jakobson et al. |
| 2012/0263285 A1* | 10/2012 | Rajakumar ............. G10L 17/00 379/189 |
| 2012/0290407 A1 | 11/2012 | Hubbard et al. |
| 2013/0110565 A1* | 5/2013 | Means, Jr. ............ G06Q 10/06 705/7.11 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

PROVIDING A TIMELINE OF EVENTS REGARDING A DATABASE RECORD

PRIORITY DATA

This patent document claims priority to commonly assigned U.S. Provisional Patent Application No. 61/939,467, titled "Systems and Methods for Providing an Event or Interaction Timeline", by Daron Martin Kallan, filed on Feb. 13, 2014, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for providing a timeline of events regarding a database record in an on-demand database service.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, devices, and methods for providing a timeline of events regarding a database record in an on-demand database service. These drawings in no way limit any changes in form and detail that may be made by one skilled in the art without departing from the spirit and scope of the disclosed implementations.

FIG. 4A shows an example of a user interface including a timeline of events regarding a contact record, according to some implementations.

FIG. 4B shows a magnified view of the timeline of events of the user interface in FIG. 4A, according to some implementations.

DETAILED DESCRIPTION

Figure 1A:
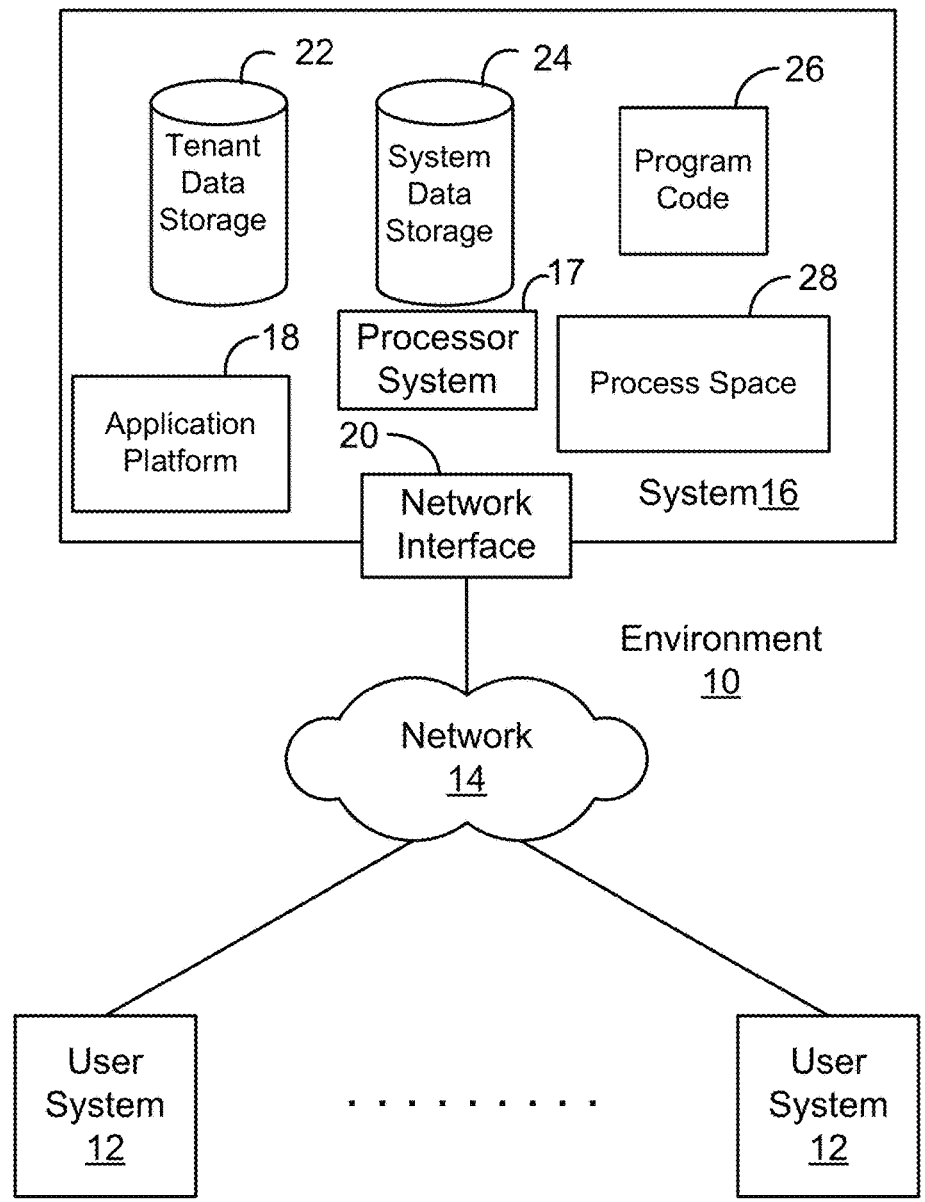
FIG. 1A shows a block diagram of an example of an environment 10 in which an on-demand database service can be used in accordance with some implementations.

Examples of systems, apparatus, devices, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined.

Conversely, what may be described herein as a single block may be implemented in multiple blocks.

Various implementations described or referenced herein are directed to different methods, apparatus, systems, devices, and computer program product for providing a timeline of events regarding a database record. The database record may be stored in a database and associated with an on-demand database service. In some implementations, the on-demand database service can include an enterprise social networking system. One example of an enterprise social networking system is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some implementations of the disclosed systems, apparatus, methods, and computer program product are configured to provide a timeline of events regarding a database record in an on-demand database service. Rather than providing information for a database record as long list of related events and interactions, a timeline can consolidate all of the related events and interactions into a single and user-friendly user interface component. Arranging events on a timeline can provide an efficient, organized, and user-friendly way of visually presenting information. Additionally, instead of hard-coding a timeline of events into an application, a timeline can be provided in a cloud computing environment using an application platform and using metadata stored in association with objects in the customer platform. Put another way, the timeline can be cloud-based and metadata-driven.

A timeline of events regarding a database record in an on-demand database service can be presented in a user interface. A series of events or interactions related to a database record can be arranged chronologically according to a timestamp of the events or interactions. The timeline can provide an organized visual layout of events or interactions related to the database record that can paint a rich picture of the database record quickly and accurately. For example, a customer representative can pull up a record of a customer and see all the most recent events or interactions related to the customer so that the customer representative can begin the conversation quickly, reduce repetition and average handling time, and make cross-channel interactions seamless. The value of such customer interactions can be much higher as a result.

A database record can be stored in a database of the on-demand database service. The database record can track various events and interactions related to it. When the various events and interactions are presented on a timeline, a more comprehensive and richer picture of the database record emerges.

What events and interactions are identified for presentation in a timeline regarding a database record can be driven by metadata. Metadata stored in association with various events and interactions can be called out by the timeline to identify certain data fields that make up the data regarding the events and interactions. That way, certain events and interactions may appear on the timeline and desired by a user. Thus, a customer representative may pull up a customer record and filter events or interactions on a timeline to display sales activities, billing activities, and/or marketing activities related to the customer. In addition or in the alternative, the customer representative may filter events or interactions on a timeline according to a specific date or time range, or may filter events or interactions according to certain accounts associated with the customer record.

Metadata may also be used to calculate a customer satisfaction rating or health-based numeric for a database record. The metadata can identify for the timeline what data fields to use to track a disposition or satisfaction metric for any event. The metadata can be used to describe the range of that disposition, such as from bad to neutral to good, for normalizing diverse scales. The metadata can also be used to describe the weighting of an event, such as different types of records or objects having greater importance in determining a customer satisfaction rating or health-based numeric. Furthermore, the metadata can be used to describe a half-life of an event, where the event may be less relevant or half as relevant as it was X days ago. Upon calculation of the customer satisfaction rating or health-based numeric using the metadata for identifying a disposition or satisfaction metric, the customer representative can quickly ascertain the customer's satisfaction level based on an aggregation of previous experiences.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record also can have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record also can have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users also can be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
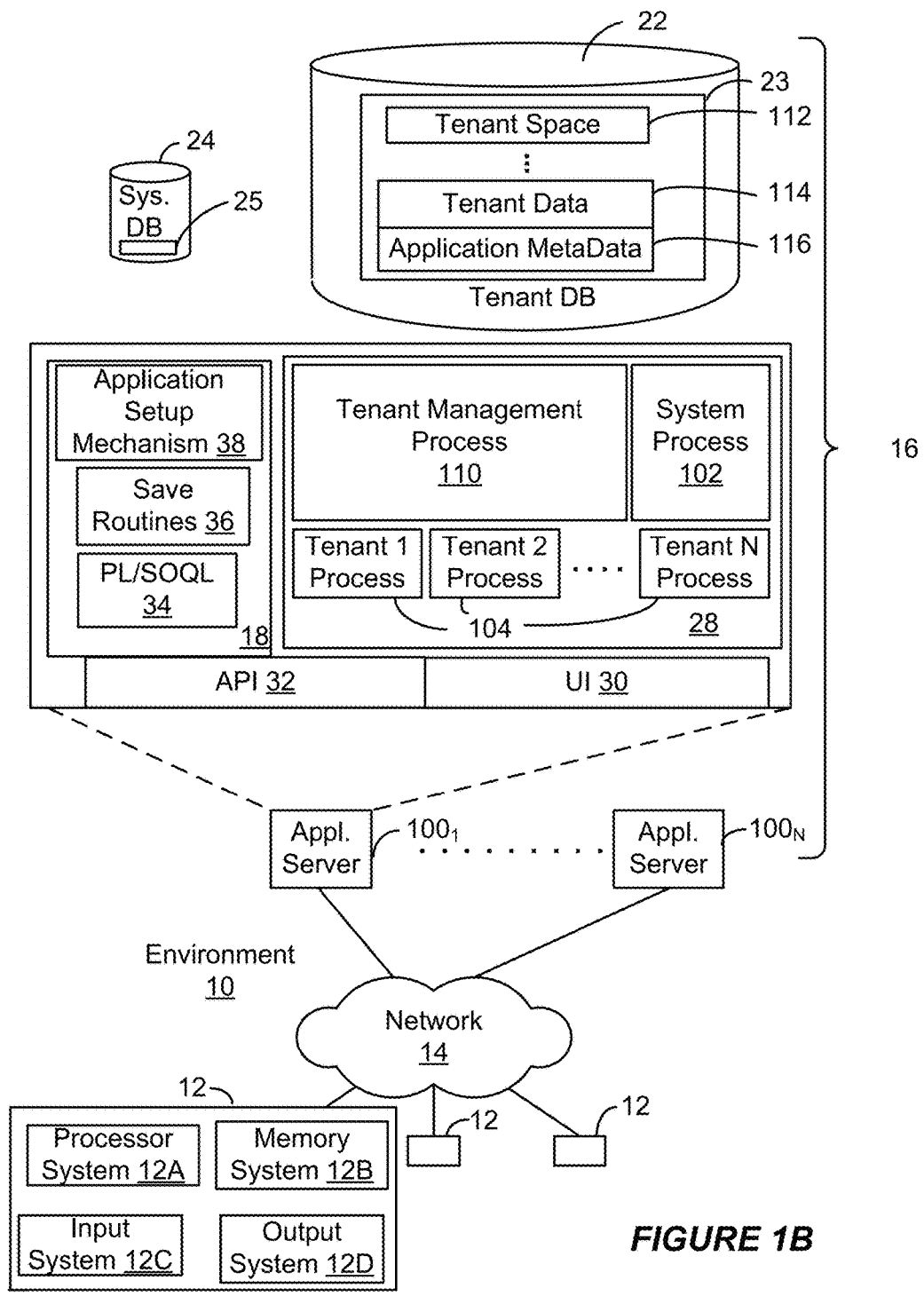
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, also may be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline back-ups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" also may be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
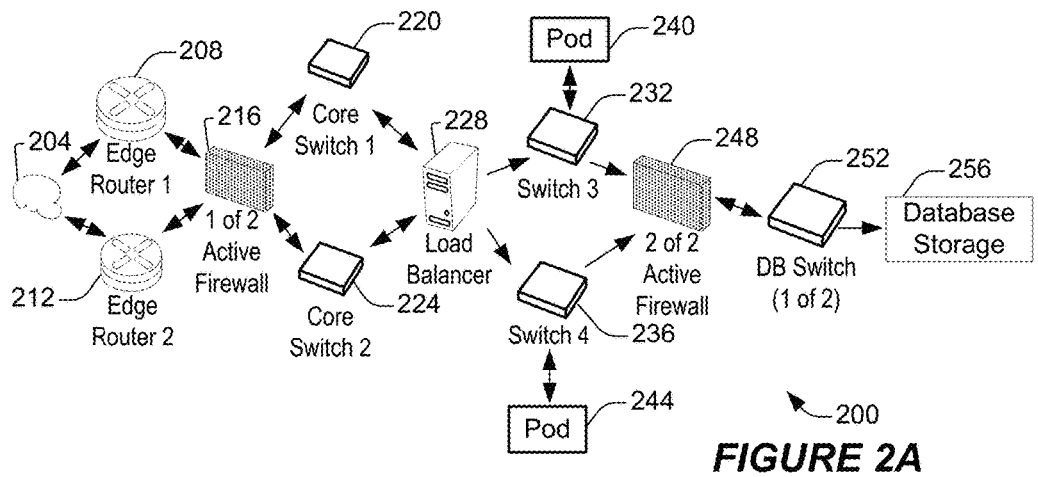
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
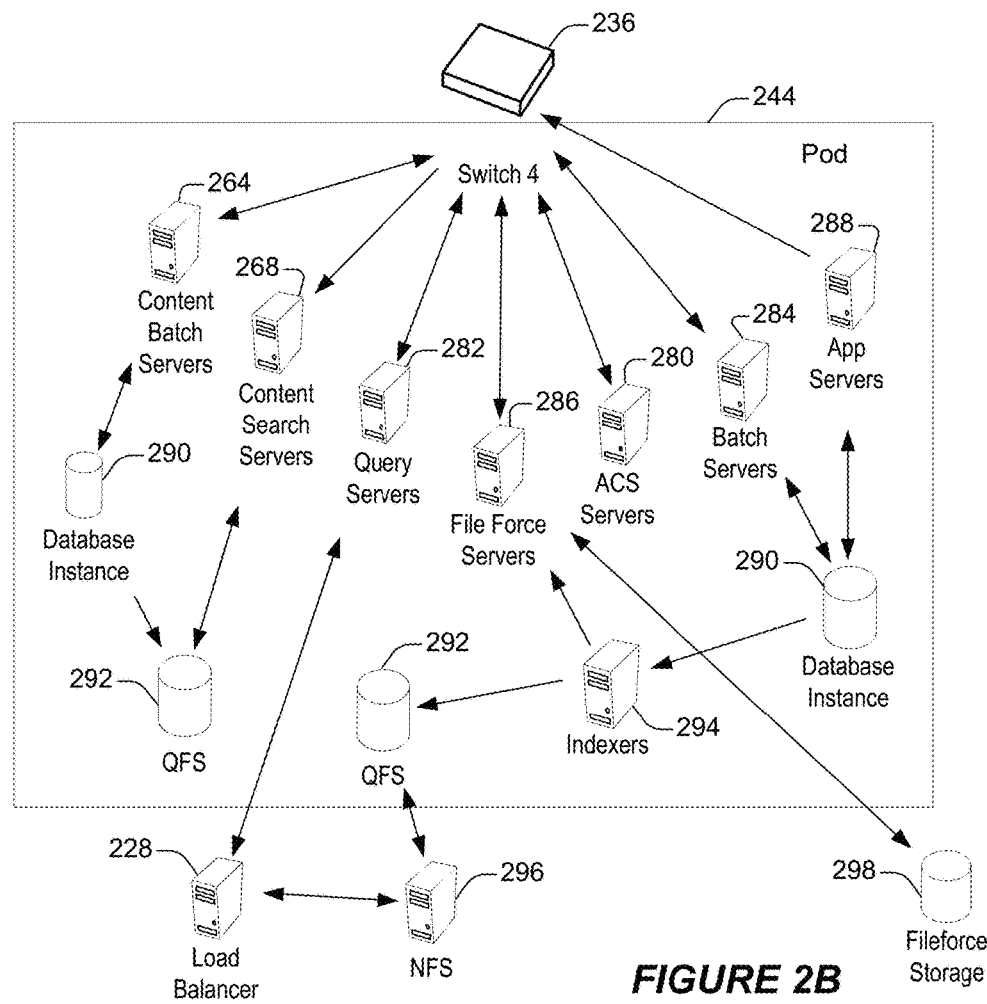
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods disclosed herein. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 also may communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

Figure 3:
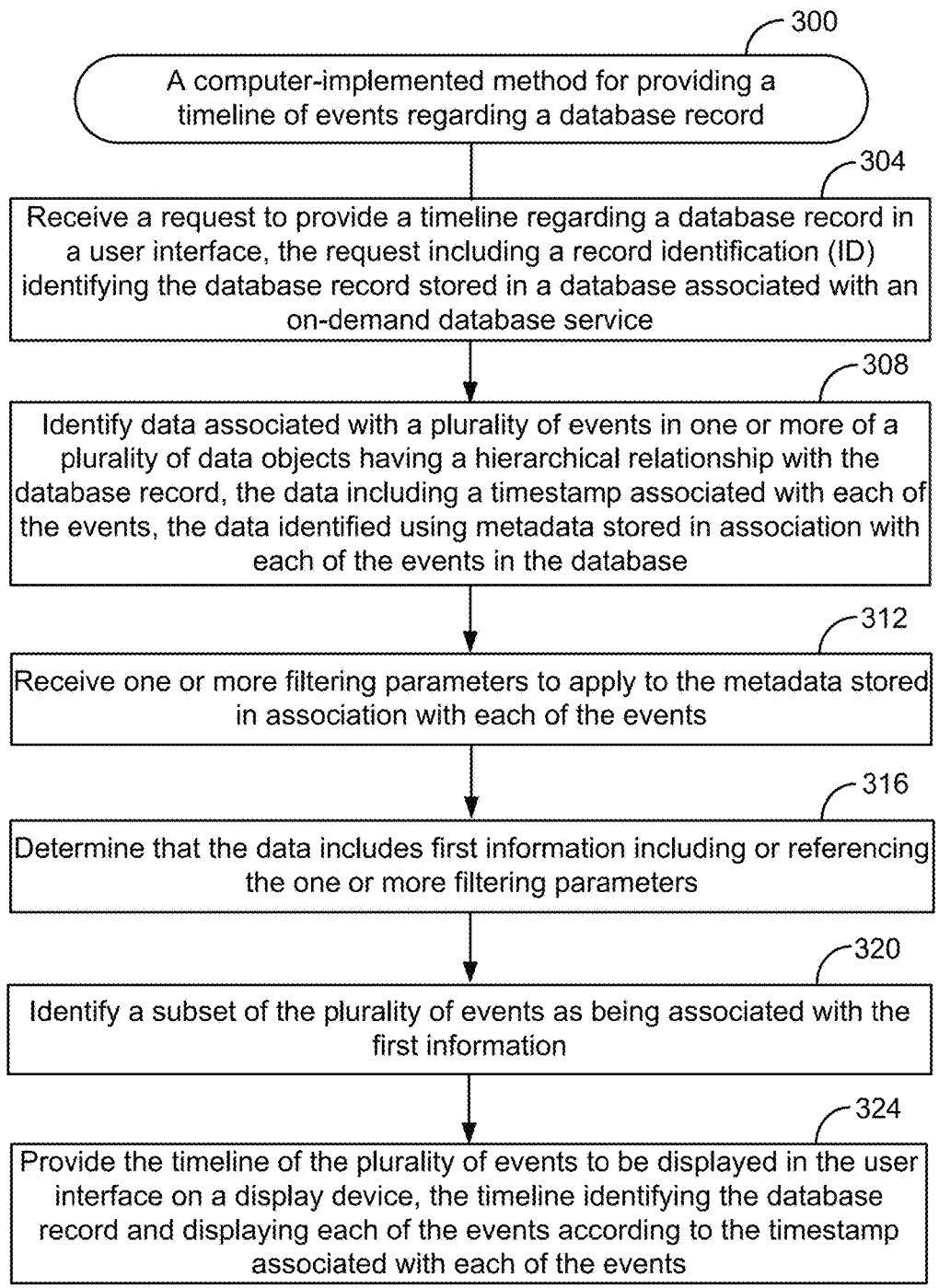
FIG. 3 shows a flowchart of an example of a computer-implemented method 300 for providing a timeline of events regarding a database record in an on-demand database service, performed in accordance with some implementations.

FIG. 3 shows an example of a flowchart of a computer-implemented method 300 for providing a timeline of events regarding a record, performed in accordance with some implementations. The operations in the method 300 may be performed in different orders and/or with different, fewer, or additional operations. The method 300 is described with reference to FIGS. 4A-4D and FIGS. 5A and 5B.

At block 304, a request to provide a timeline regarding a database record in a user interface is received at one or more servers, the request including a record identification (ID) identifying the database record stored in a database associated with an on-demand database service. A timeline can be presented as a visual component in a user interface that arranges events chronologically across a dimension of time. The request to provide the timeline can be made by a user or system-generated. The request can be made upon querying a database record stored in a database associated with an on-demand database service. For example, when a user navigates to a contact record of an enterprise social networking system, a timeline of events regarding the contact record can be automatically requested for display in the user interface, or the user can select that a timeline of events be provided from the user interface. The user can provide the timeline as a visual component in a console, a mashup, or a page layout of the database record or another database record related to the database record. In some implementations, the request can be made by the system to query for raw data regarding various events to generate a timeline of the events. The request can include a record ID identifying the database record, where the record ID can be a unique ID for accurately identifying the source (e.g., database) of the database record. The request can be made from a user device, such as a smartphone, a tablet, a laptop computer, a wearable display device such as Google Glass, or a desktop computer.

At block 308, data associated with a plurality of events in one or more of a plurality of data objects having a hierarchical relationship with the database record is identified. A hierarchical relationship can refer to a parent-child, parent-grandchild, parent-great grandchild, etc. relationship in the database. In other words, the database record can have descendant objects related to it, such as child objects, grandchild objects, great grandchild objects, etc. The database record can also be related to one or more parent objects. For example, a task relating to an opportunity can be a child, while the opportunity is the parent. In another example, a deal related to an account is a child, and the account is the parent.

In some implementations, data objects having a hierarchical relationship (e.g., parent-child relationship) with the database record can be tracked by the one or more servers. Accordingly, a data object related to the database record and having a timestamp can be rendered in the timeline as an event. In some implementations, tracking of particular events can refer to configuring of metadata so that the timeline includes data objects representing events. The configuration of the metadata can filter the data objects and thereby reduces the scope of a data set. For example, a database record can track its cases, activities, opportunities, tasks, etc. in a timeline, and events in those cases, activities, opportunities, etc., can be displayed in the timeline. If a user wishes to track problem portal cases, the user can choose to track "closed cases" of origin "portal" and record type "problem." Such filtering of data is discussed in greater detail below.

In some implementations, the data objects can include customer relationship management (CRM) objects. Examples of CRM objects include leads, cases, accounts, opportunities, tasks, contacts, campaigns, contracts, events, and custom objects. The database record itself can be a CRM object. In some implementations, the data objects can be any one of a number of descendant objects of the database record, including but not limited to activities, attachments, emails, social networking posts, social networking comments, and online chats.

To illustrate an example, a customer timeline can include a timeline regarding an account. The timeline regarding an account can track events related to the account, where each event is an object having a timestamp. The events can include cases related to the account. The events can include emails and activities related to the account, where the activities can include certain tasks and events such as logged calls, site visits, meetings, etc. The events can include attachments such as files and notes attached to the account. The events can include asset expirations such as the end date of a subscription. The events can include opportunities, such as opportunities that are won, lost, or pending. The events can include campaign histories, such as when a member was included in a given campaign. The events can include social networking posts, live agent online chats, work order posts, and more.

At block 308, the data includes a timestamp associated with each of the events. The timestamp can refer to any indication of when an event occurred. For example, the timestamp can be a sequence of characters that identifies a time/date of the event. Data regarding a timestamp may be ascertained from a time/date field provided in the data object of the event. Metadata stored in association with the event can identify the timestamp.

Continuing at block 308, the data is identified using metadata stored in association with each of the events in the database. The metadata describes the data fields that make up the data. A database record and any of its data objects can each be represented by a database table, where the database table can describe the database record and/or its data objects in some implementations. The database table can include one or more data fields or categories logically arranged as columns in a viewable schema. Each row of the database table can include an instance of data for each data field or category. Therefore, the metadata describes the data fields in the columns that make up each instance of data in the rows.

The metadata can describe what object types (or database tables) and what fields (or columns) are queried for display in the timeline. The metadata can also describe how the object type relates to the database record. For example, how the object type relates to the database record can be ascertained via look-ups, master detail relationships, or foreign keys. In some implementations, the metadata does not describe all of the data fields that make up a data object, but only those data fields of interest to the user. This includes those data fields of interest according to the one or more filtering parameters described below.

In some implementations, the method 300 further includes retrieving the data associated with the events from the metadata stored in association with the events in a database, the metadata identifying for each event one or more of: a title, an object type, an object ID, a source, a description, a priority, a timestamp, and a user disposition. The title can refer to the name of the event as rendered on the timeline. The object type or record type can permit filtering of particular types of events. In addition to the user disposition, the metadata can also identify a range/scale for the disposition, a weighting, and a half-life for aggregation and calculation of the satisfaction rating or health-based numeric. The metadata can also identify for each event a primary key field for drilling down into event details and a secondary key field or hover field for displaying additional information on the timeline. In some implementations, the metadata can identify certain inclusion fields for custom filtering of specific data. In some implementations, the metadata can identify a starting timestamp and an ending timestamp. The metadata may also identify display metadata, including colors, icons, images, etc. In some implementations, the metadata can identify look-up, master-detail relationships, or foreign keys to parent records or related records. For example, the look-up can informally identify information of how an object is related to another object, and the master-detail relationship can more formally provide information of how an object is related to another object. In some implementations, the look-up can identify a column or data field that includes the primary ID of a related record.

An instance of data for a title, an object type, an object ID, a source, a description, a timestamp, and a user disposition may be rendered differently depending on the event. For example, an event for completion of a task can include data that recites "Sat Jul 23 02:16:57 2005" while another event for a logged call recites "2005-10-30 T 10:45 UTC." The metadata can identify that each instance of data represents a timestamp. In another example, a user disposition for an event may indicate "5" on a scale of 1-5 regarding customer satisfaction for a phone call, while another event may indicate "excellent" regarding customer satisfaction of a service performed for the customer. The metadata may identify that each instance of data represents a user disposition. The metadata identifies the appropriate instance of data by identifying the appropriate data field that make up the instance of data.

The metadata describes what data fields to use to identify a title, an object type, an object ID, a source, a description, a priority, a timestamp, or a user disposition. Specifically, the metadata can be used to determine the title, the object type, the timestamp, the user disposition, etc. In some implementations, the metadata can be customizable. Metadata can be defined by a user, an administrator, or system-generated so that the appropriate instances of data are identified from each of the events.

In some implementations of the method 300, a determination is made that the data includes information including or referencing the record ID. The identified data associated with each of the events can be descriptive of the event and organized into various data fields. Some of the data in the various data fields may include information that includes or references the record ID. One or more servers may process the data and perform a "look-up" for the record ID in some or all of the data fields. In some implementations, the look-up can process any data in data fields that describe the event's record relationship. When any portion of the data includes or references the record ID, then a determination can be made that the event is related to the database record. As a result, any event that is related to the database record is eligible to be presented in the timeline.

If a database record is a contact for Joe Smith, then a user may want to generate a timeline showing all the events related to Joe Smith. A query can be made from a user device to one or more servers to locate any event that is related to Joe Smith. Any object stored in a database associated with an on-demand database service and having a timestamp that can be queried may be provided in a timeline on the on-demand database service. A data entry in an object referencing Joe Smith, such as a case object having a timestamp and having a title "Service repair for Joe Smith," may be eligible for rendering in the timeline for Joe Smith.

At block 312 of the method 300, one or more filtering parameters are received at the one or more servers to apply to the data using the metadata stored in association with each of the events. At block 316, a determination is made that the data includes first information including or referencing the one or more filtering parameters. The one or more filtering parameters may refer to one or more filtering categories identifiable by the metadata stored in association with each of the events. In some implementations, the filtering parameters may reference data fields identified by the metadata and filter out any data in the data fields that does not satisfy the filtering parameters. Thus, the timeline can filter events according to the data, and the metadata can instruct the filtering parameters on where, what, and how to use the data. The filtering parameters provide conditions for certain events to be included in the timeline. If the values in the data fields identified by the metadata fail to satisfy such conditions, then any event associated with such values are prevented from displaying or otherwise not displayed in the timeline. Alternatively, any event associated with such values may appear differently than other events in the timeline.

A filtering parameter may conditionally include events based on satisfaction of values in a data field. The filtering parameter identifies the appropriate data fields using the metadata, and specifies the values for satisfaction of the condition provided by the filtering parameter. In some implementations, the filtering parameter may specify a certain time frame using the timestamps associated with each event. For example, the time frame can be between Jul. 21, 2013 and Jul. 21, 2014 to limit the events to only such a time frame. In some implementations, the filtering parameter may specify certain terms using the description associated with each event. For example, the term can include "billing" so that only events that reflect billing in their description are provided in the timeline. In some implementations, the filtering parameters can apply multiple filters across different categories to events of the same type. For example, the filtering parameters can specify won opportunities or lost opportunities, Twitter posts or Facebook posts, open cases or closed cases, trouble cases or question cases, hot cases or cool cases, phone activities or email activities, and so forth.

A filtering parameter may conditionally include events based on satisfaction of an object type. The metadata may identify an object type associated with an event. In some implementations, object types can refer to categories in which the events can be organized. For instance, some of the categories may be user-defined. Some of the categories may include, for example, events that are phone calls, site visits, meetings, billings, tasks, and more. In some implementations, object types can refer to record types. Some of the record types can include cases, accounts, contacts, leads, opportunities, tasks, emails, activities, asset expirations, opportunities, campaigns, and more. In some implementations, the record types can be further sub-categorized, where the filtering parameter may specify a type of activity, such as sales activities, marketing activities, product development activities, billing activities, and more.

The one or more filtering parameters may be configured to control what events are displayed. The timeline can be constructed to visually display events according to satisfaction of the filtering parameters. In some implementations, the filtering parameters can cause some of the events to be displayed while some of the events to be hidden with respect to a timeline regarding a given database record. In some instances, the timeline regarding the database record can be constructed thematically so that only events meeting certain conditions of the filtering parameters are displayed. By way of an example, a timeline for an account may display only events involving financial transactions, a timeline for the same account may display only events involving email correspondence, or a timeline for the same account may display only events involving opportunities lost, won, or pending. A user may switch to different views of the timeline by changing the filtering parameters.

The one or more filtering parameters may be configured to control how the events are displayed in the timeline. In some implementations, the filtering parameters can cause events to be displayed in a particular arrangement in the timeline. Some categories of events may be arranged spatially in different positions than other categories of events. For example, cases may be arranged higher than emails, or events flagged as urgent may be arranged higher than events flagged as non-urgent. In addition or in the alternative, some categories of events may be color-coded differently, some categories of events may be formatted differently, or some categories of events may be represented by different graphical representations. Thus, the filtering parameters may provide for any number of ways to arrange different categories of events that satisfy the conditions of the filtering parameters in the timeline.

In the on-demand database service, a database record can have multiple relationships with more than one entity. In fact, a database record can have hierarchical relationships with several entities. The entities can include data objects having a hierarchical relationship (e.g., child-parent relationship) with the database record. Typically, a timeline for a database record displays all of the events across all the data objects related to the database record. However, the one or more filtering parameters can cause the timeline to display events for one, a few, or all of the data objects related to the database record. Hence, the one or more filtering parameters indicate the hierarchical relationship with the database record. This allows a user to drill down to certain relationships with the database record in the timeline.

For example, an account can be associated with more than one contact, and each contact may be associated with multiple other accounts. The filtering parameters can be adjusted to provide an account timeline displaying events in the account record to reflect one of the contacts. Or, the filtering parameters can be adjusted to provide a contact timeline displaying events in the contact record to reflect one of the accounts for that contact record. Other scenarios can involve multiple entities having relationships to one or more entities. The timeline of events may visualize the relationships of an entity. Alternatively, the timeline of events may visualize a specific relationship of an entity. This allows a user to switch to view the timeline of events in terms of a specific context of a given entity. This feature of drilling down to one or more specific relationships out of many relationships in a timeline may be referred to as "contextual switching" or "contextual account switching."

To illustrate an example through the perspective of a customer service representative, a caller may call in and be identified by the customer service representative. The customer service representative pulls up a contact record for the caller. A timeline of events related to the contact record for the caller may be generated. The caller explains that he wishes to talk about his Florida vacation home. The customer service representative can apply a filtering parameter to limit events in the timeline to only events related to the account record for the Florida vacation home. As a result, a timeline is provided that displays activities and events related specifically to the Florida vacation home account for the caller.

At block 320 of the method 300, a subset of the plurality of events is identified as being associated with the first information. The one or more servers identify the subset of events to be provided for display in a timeline. The subset of events is identified using the one or more filtering parameters.

At block 324 of the method 300, a timeline of the subset of events is provided for display in a user interface on a display device. The timeline identifies the database record and presents each of the subset of events according to the timestamp associated with each of the subset of events in the database. The timeline of the subset of events can graphically represent each of those events across a dimension of time. The dimension of time can be adjusted to present a particular time frame in terms of minutes, hours, days, weeks, months, years, and more. The events can be arranged chronologically using the timestamps associated the events. Therefore, the events are arranged according to satisfaction of the one or more filtering parameters.

In some implementations, the timeline includes the identified data associated with the subset of events. In some implementations, the timeline partially includes the identified data for display in the user interface. The timeline may render only certain pieces of information for each event from the identified data, such as a title of the event and an object type. When a user hovers over or selects an event in the timeline, the timeline may present more information from the identified data. For example, the identified data may be rendered in a pop-up window. The identified data can include one or more of a title, an object type, an object ID, a source, a description, a priority, a timestamp, or a user disposition. Accordingly, the metadata can describe what data fields are displayed in the timeline when a user hovers over an event or when a user clicks on an event. The identified data may be included in the timeline using the metadata stored in association with each of the events. In some implementations, the identified data can include a selectable link configured to reference one of the data objects. When a user clicks on the selectable link, the user can navigate to a page representing the data object. The metadata can describe which ID to use when the user clicks to drill in on an event record's detail.

Each event rendered in the timeline can be an object presenting data associated with the event. The data is taken from the metadata describing the data fields that make up the data. The data fields may be logically arranged as columns in a database table for an object. The objects are stored in the database of the on-demand database service, and users may be permitted to access such objects through the timeline.

The timeline can be a visual component in the user interface, such as a visual component in a page layout of the database record. In some implementations, the timeline can be configured to be displayed horizontally or vertically across a page layout, and can have fixed or customizable dimensions. A user may be able to scroll across the timeline and may be able to zoom in and out of the timeline.

The events presented in the timeline may be visually distinguishable from one another. An event may visually distinguish itself from other events by position and by icons, markers, images, color, shapes, patterns, words, or other characteristics. For example, an event categorized as a case may be color-coded differently than an event categorized as an email. How events are presented in the timeline to visually distinguish from one another may be customizable by a user. The metadata stored in association with the events can define into which categories certain events should be grouped and which icons should be used to symbolize such events in the timeline. A single event may be related to more than one database record, and such an event may be presented differently in timelines depending on the database record in which it is being presented. For example, a completion of a task may be presented as an event in a timeline for the assignor and for the assignee. However, the event may be presented differently in each timeline because the event is related to the assignor differently than the assignee. For instance, the event may be color-coded differently in the timeline for the assignor than in the timeline for the assignee.

The same event or set of events for a given database record may be presented differently in a timeline depending on the one or more filtering parameters. A user may apply filtering parameters to hide certain events satisfying a particular condition. A user may apply filtering parameters to color-code certain events satisfying a particular condition. A user may apply filtering parameters to arrange differently on the timeline certain events satisfying a particular condition. For example, the filtering parameters may cause cases involving troubleshooting or outages to be stacked higher or otherwise arranged differently than other mundane events in the timeline. Without the filtering parameter, the same cases may not be arranged higher or differently than the other mundane events in the timeline.

In some implementations, the method 300 can further include aggregating user-defined characteristics identifying the user disposition of each event from the metadata, and determining a satisfaction rating to associate with the database record based on the aggregation. Events occurring in the on-demand database service can have user-defined characteristics assigned to them. The identified data from block 304 can include the user-defined characteristics. The user-defined characteristics can describe a sentiment or user disposition regarding the event. In some implementations, the user-defined characteristic can be a color, an image, a numerical value or rating, or a string of characters such as "good", "bad", and "average. These characteristics can be aggregated from the user disposition associated with each of the events in the database. The satisfaction rating or health-based numeric can be calculated, which can represent a satisfaction level or health of a database record. For example, a customer service representative can pull up a contact or account and quickly ascertain whether the past experiences of the customer have been negative, neutral, or positive.

In some implementations, aggregating the user-defined characteristics from the metadata can include normalizing the user-defined characteristics, weighting one or more data items associated with the one or more events to produce a metric, and applying the metric to the normalized user-defined characteristics. First, since the user-defined characteristics may utilize different scales and measurements, the user-defined characteristics can be normalized. For example, cases can have values from 1-5, social networking posts can have values from 1-10, and phone calls can have colors including red, yellow, and green. Normalization can bring such values and colors into the same range and measurement. Second, some events may be weighted more heavily than others. Some data items taken from certain data fields for an event may be "counted" more than others. Put another way, relevant events can be counted as more relevant than other events. Using a data field for object type, for example, cases may be weighted more heavily than emails. Using a data field for priority, cases flagged as urgent may be weighted more heavily than other cases that are not flagged. Weighting such data items from certain data fields can produce a metric for calculating an overall satisfaction rating. In some implementations, the weighting can include a "half-life," where more recent events can be weighted more heavily than less recent events. For example, a half-life of 30 days can mean that any user-defined characteristic for an event after 30 days can be halved. Third, the metric can be applied to calculate and determine the satisfaction rating to associate with the database record by using the weighting and the normalized user-defined characteristics. In some instances, the metric can continuously update the satisfaction rating. Additional user-defined characteristics and updated user-defined characteristics for events can be provided over time. The metric can constantly recalculate the satisfaction rating using such new information.

Figure 4A:
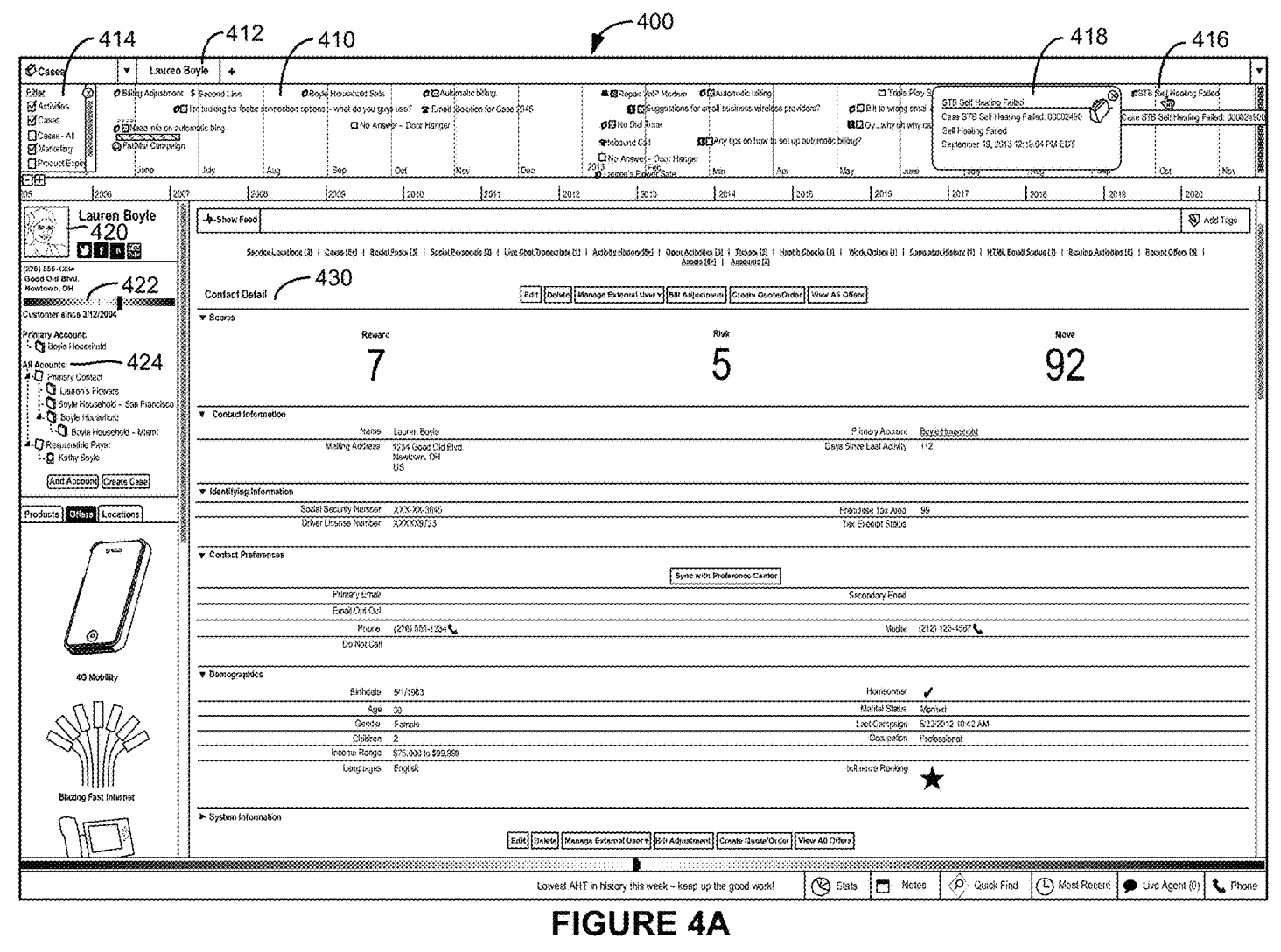
Figure 4B:
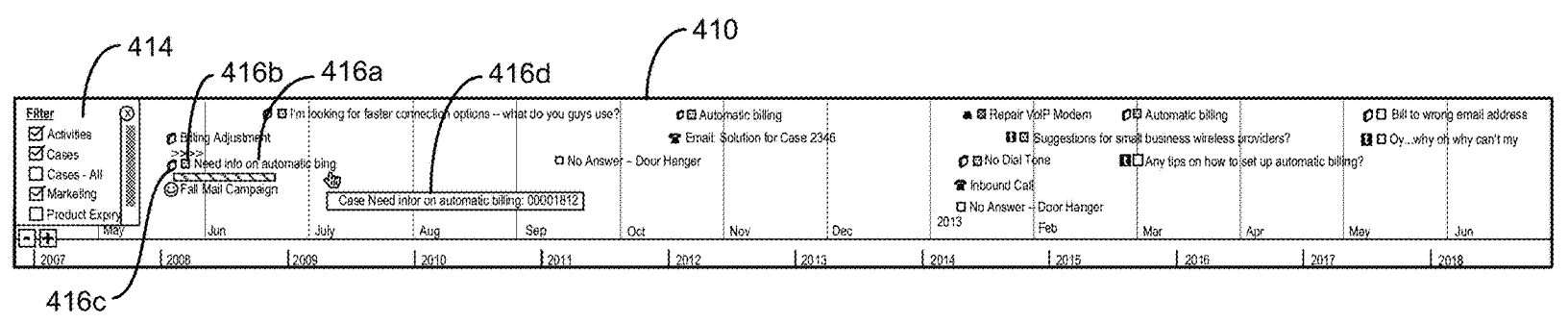
Figure 4C:
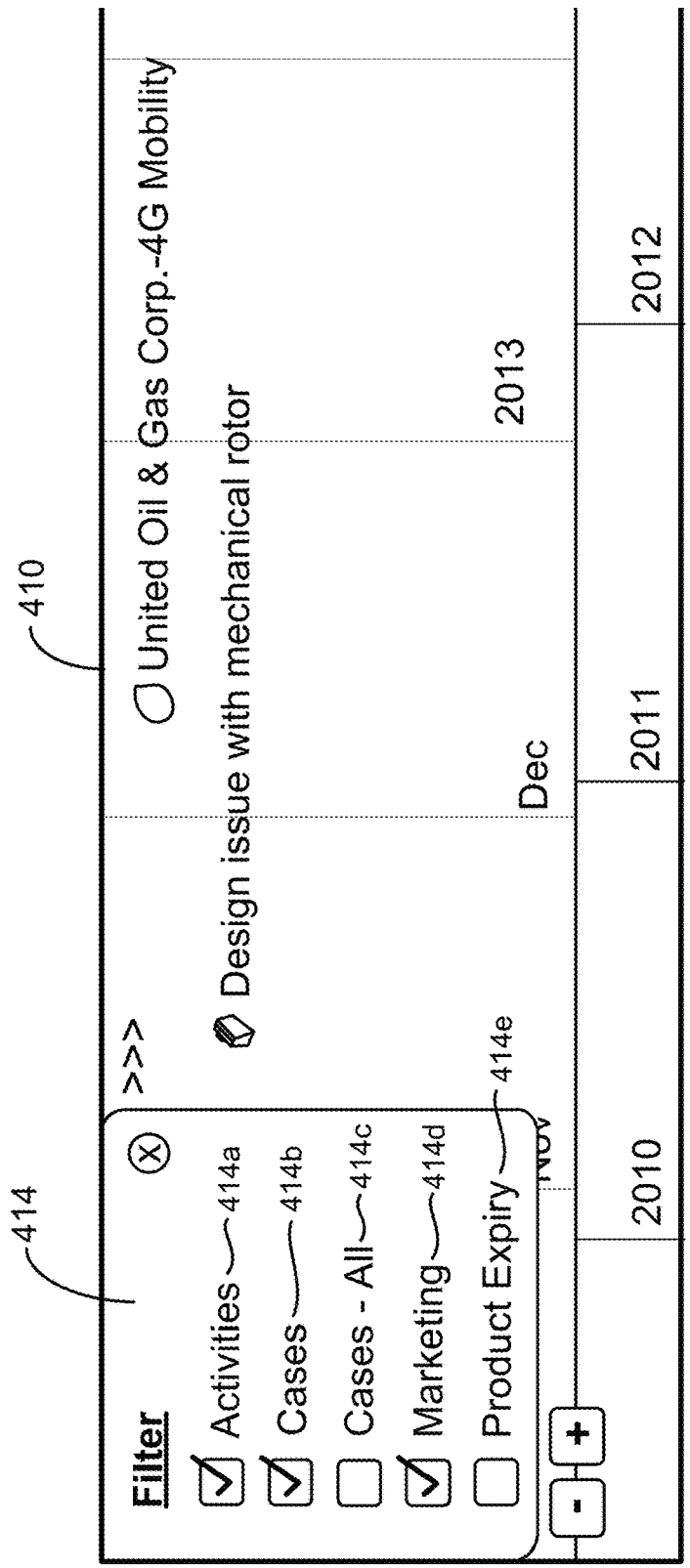
FIG. 4C shows a magnified view of filtering categories for the timeline of events of the user interface in FIG. 4A, according to some implementations.

FIG. 4A shows an example of a user interface including a timeline of events regarding a contact record, according to some implementations. A user interface 400 can provide information to a display device regarding a database record, namely a contact record for Lauren Boyle in FIGS. 4A-4D. The contact record can be stored in a database associated with an on-demand database service. The user interface 400 includes a timeline 410, a profile 420, and contact details 430. The timeline 410 includes events 416 chronologically arranged horizontally across a dimension of time. When a user hovers over or selects an event 416, a pop-up 418 is displayed to provide additional information regarding the event 416. What events 416 are displayed on the timeline 410 can be controlled by a filter 414. Selection of a tab 412 for Lauren Boyle above the timeline 410 can cause the timeline 410 to include events 416 related to Lauren Boyle.

The timeline 410 can be a visual component displayed above the contact details 430 in the user interface 400. The contact details 430 can include record information regarding Lauren Boyle. This includes scores, contact information, identifying information, contact preferences, demographics, and system information. The user interface 400 can include a tab configured to show a record feed for Lauren Boyle instead of record information.

The user interface 400 can further include a profile 420 for Lauren Boyle to the side of the contact details 430. The profile 420 can include a satisfaction meter 422 and list all of the accounts 424 associated with Lauren Boyle.

FIG. 4B shows a magnified view of the timeline of events of the user interface in FIG. 4A, according to some implementations. Each of the events 416 in the timeline 410 can be presented chronologically in a time frame from May 2013 to June 2014 according to the timestamps associated with each of the events 416. Applying the filter 414 to the timeline 410, the events 416 displayed in the timeline 410 include those events 416 that are not only related to Lauren Boyle, but that are also activities, cases, and marketing events. Therefore, a user viewing the user interface 400 on the display device can ascertain all the activities, cases, and marketing events that have occurred involving Lauren Boyle within approximately the past year. Each event 416 on the timeline 410 can include a name or description 416a of the event. In addition, some events 416 can include a first icon 416b indicating a color, and some events 416 can include a second icon 416c representing a category. For example, the first icon 416b can be a color representing a user disposition regarding the event 416, and the second icon 416c can be an icon representing the record type (e.g., case) associated with the event. When a user hovers over the event 416, a pop-up 416d can be displayed in the timeline providing additional information or at least a full name or description of the event 416. However, what fields are identified by the metadata for display in the pop-up 416d can be customizable. When a user clicks on an event 416, a bubble or window (not shown) may appear that includes a title, an image/icon, a description, and any "hover" information provided in the pop-up 416d. Nonetheless, what fields are identified by the metadata for display when a user clicks on an event 416 can be customizable. Different information as defined by the metadata can be displayed depending on whether the user clicks or hovers over an event 416.

The information presented for each event 416, such as in the name/description 416a, the first icon 416b, and the second icon 416c, can be rendered from the identified data that is associated with the events 416. The data can be identified using metadata stored in association with each of the events in the database associated with the on-demand database service. The metadata can describe the data fields for the name/description 416a, the user disposition for the first icon 416b, and the record type for the second icon 416c. Each of the events 416 may correspond to data objects having a hierarchical relationship with the database record. In the timeline 410, the data objects for the events 416 are descendant objects (e.g., child objects) of the contact record for Lauren Boyle.

FIG. 4C shows a magnified view of filtering categories for the timeline of events of the user interface in FIG. 4A, according to some implementations. The filter 414 can be represented by a panel with checkboxes configured to receive a user input. A user input or selection with respect to the checkboxes can filter what events are displayed in the timeline 410. The filter 414 can include multiple filtering parameters 414a, 414b, 414c, 414d, and 414e configured to present events 416 that satisfy any of the selected filtering parameters. In FIG. 4C, the filtering parameters for activities 414a, for cases 414b, and for marketing 414d are selected. Events 416 not satisfying the filtering parameters 414a, 414b, and 414d are otherwise hidden. The filtering parameters 414a, 414b, and 414d are applied to the identified data associated with the events 416 using the metadata stored in association with the events 416. The filtering parameters 414a, 414b, and 414d cause the timeline 410 to conditionally include those events 416 that have data satisfying the filtering parameters 414a, 414b, and 414d, where the data is identified using the metadata stored in association with the events 416.

Figure 4D:
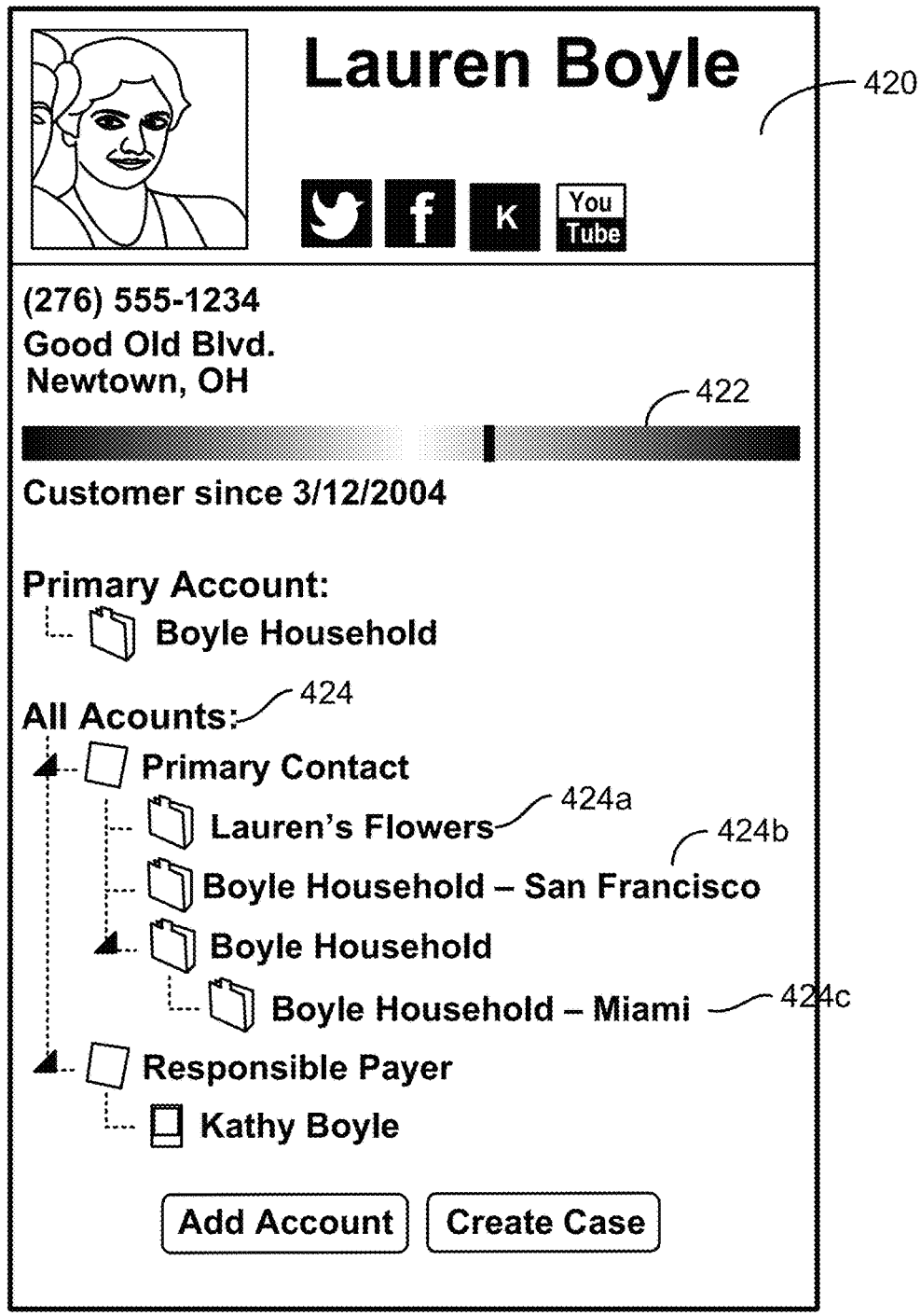
FIG. 4D shows a magnified view of a presentation of account records associated with the contact record of the user interface in FIG. 4A, according to some implementations.

FIG. 4D shows a magnified view of a presentation of account records associated with the contact record of the user interface in FIG. 4A, according to some implementations. A profile 420 in the user interface can include basic information regarding the contact record for Lauren Boyle. The profile 420 can also include a satisfaction meter 422 and account records 424 associated with Lauren Boyle. In the profile 420, the satisfaction meter 422 can display Lauren Boyle's overall satisfaction rating across one or more accounts based on an aggregation of Lauren Boyle's dispositions regarding the events 416 in the timeline 410. In FIG. 4D, the satisfaction meter 422 can be a color gradient, where a marker indicates Lauren Boyle's satisfaction rating on the color gradient. The satisfaction rating in the satisfaction meter 422 can be determined by aggregating user-defined characteristics (e.g., color) from the user disposition regarding at least some of the events 416 in the timeline 410. The metadata stored in association with each of the events 416 can identify the user disposition. Here, the user-defined characteristics can be colors spanning a color gradient to indicate dispositions or sentiments regarding the events 416.

In FIG. 4D, all of the accounts 424 associated with Lauren Boyle are provided in the profile 420. Each of the accounts 424a, 424b, and 424c can include accounts in which Lauren Boyle is the primary contact. Such accounts include Lauren's Flowers 424a, Boyle Household—San Francisco 424b, and Boyle Household—Miami 424c. Even though Lauren Boyle is associated with several accounts, a user can drill down to one or more of the account relationships. The user can select one or more accounts and cause the timeline 410 to display events 416 relating to the selected one or more accounts. In that sense, the user can contextually switch between accounts 424a, 424b, and 424c to generate different timelines of events 416. In other words, as the user clicks through different contact-account relationships, the timeline 410 changes to show events 416 specific to that contact-account relationship.

Figure 5A:
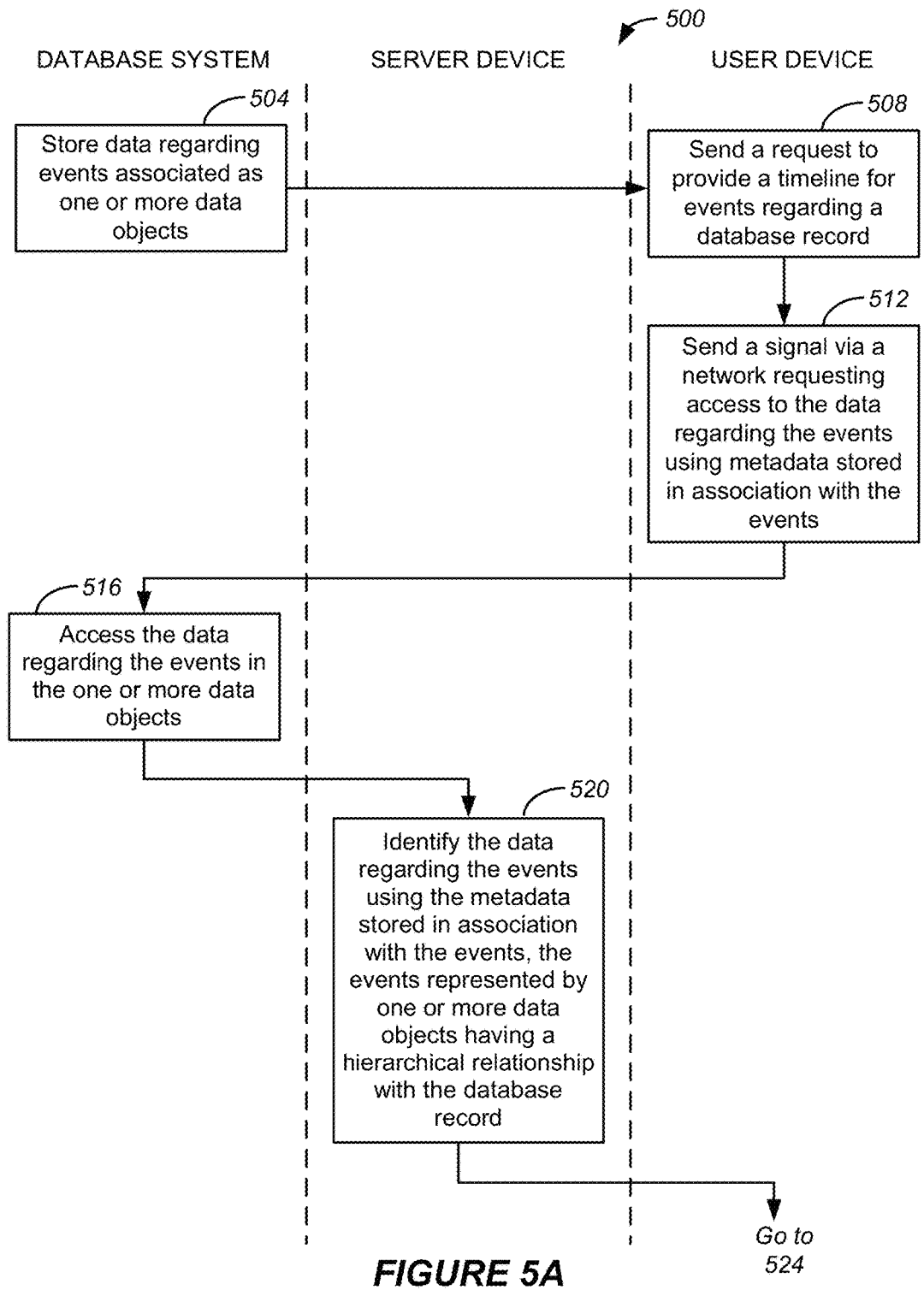
FIGS. 5A and 5B show an example of a diagram of operations performed amongst a user device, a server device, and a database system for providing a timeline of events regarding a database record, performed in accordance with some implementations.
Figure 5B:
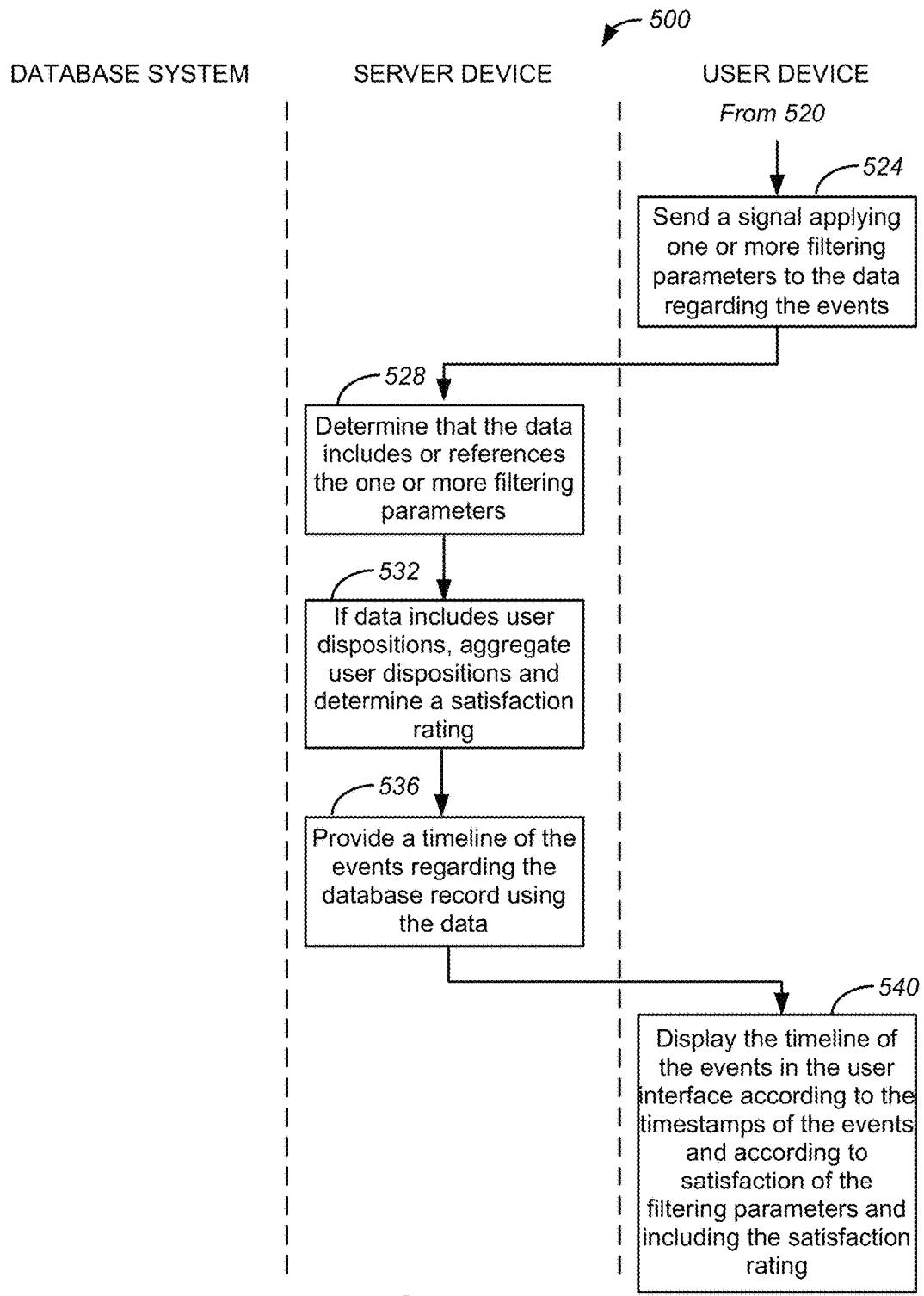

FIG. 5A shows an example of a diagram 500 of operations that are performed amongst a user device, a server device, and a database system for providing a timeline of events regarding a database record. The operations in the diagram 500 may be performed in different orders and/or with different, fewer, or additional operations. In some implementations, the diagram 500 is a system timing diagram. The operations in the diagram 500 are described with reference to FIGS. 1A-1B and 2A-2B.

At block 504, data can be stored regarding events as data objects in a database system. The database system can be a database system 16 as shown in FIG. 1A. The data can include a timestamp. The data can further include a name of the event, a description of the event, a type of event, a priority of the event, and a user disposition regarding the event. Such data is retrievable using metadata stored in association with the event. In some implementations, the data regarding the events can be stored and maintained in one or more database tables associated with the data objects.

At block 508, a request to provide a timeline of events regarding a database record is made from a user device. The user device can be a display device, such as a smartphone, a tablet, a laptop computer, a wearable display device such as Google Glass, or a desktop computer. The user device can be a user system 12 as shown in FIG. 1A. The request can be made by a user or system-generated. The request can include a record ID identifying the database record stored in the database system.

At block 512, a signal is sent via a network requesting access to the data regarding the events using the metadata stored in association with the events. As shown in FIG. 1A, for example, the user system 12 can send the signal via network 141 to a network interface 20 of the database system 16. The metadata is used to look for what data objects should be accessed and what data fields are to be queried. The metadata identifies the data fields for accessing the data regarding the events.

At block 516, the data regarding the events is accessed at the database system. The data objects are queried in the database system using the metadata. Furthermore, the appropriate data fields are queried using the metadata to access the data regarding the events. Any events related to the database record are identified. The data regarding such events are accessed, where the data can include information including or referencing the record ID. The data can also include timestamps associated with the events.

At block 520, the data regarding the events is identified by the server device using the metadata stored in association with the events, where the events are represented by one or more data objects having a hierarchical relationship with the database record. Server devices can include server devices in pod 244 or in communication with pod 244 of FIG. 2B. Such server devices can include but is not limited to content batch servers 264, content search servers 268, query servers 282, file force servers 286, ACS servers 280, batch servers 284, app servers 288, database instances 290, indexers 294, and load balancers 228.

The data objects can be descendant objects (e.g., child objects) of the database record. Such descendant objects can include those objects of the parent object that go one, two, three, four, or more levels deep. Examples of such descendant objects include but are not limited to cases, accounts, contacts, leads, opportunities, contracts, campaigns, tasks, and work orders. Other descendant objects can also include emails, activities, attachments, social networking comments, social networking posts, and online chats. The server device can track interactions with any of the aforementioned descendant objects, where such interactions can constitute events in the database system.

In some instances, the identified data can be determined to include or reference the record ID. The server device can perform a look-up on the identified data to see if any of the data references the record ID. In some implementations, the server device can process instances of data in particular data fields. Any event associated with instances of data that references the record ID can constitute events related to the database record.

At block 524, a signal is sent from the user device to apply one or more filtering parameters to the data regarding the events. The one or more filtering parameters may be defined by the user on the user device. For example, the user may select a category from a menu or enter in the category to provide a filtering parameter. The filtering parameters can include conditions that the data regarding the events may or may not satisfy. If any of the values for any of the data regarding an event satisfy the conditions, the event may be included in the timeline.

At block 528, a determination is made by the server device that the data includes or references the one or more filtering parameters. The filtering parameters use the metadata stored in association with each of the events at the server device to call the appropriate data fields that make up the data for the events. The data in the appropriate data fields may be stored in database tables associated with the data objects representing the events. For example, a filtering parameter may cause to display events related to a certain health care account. The metadata may describe account IDs and account names for identifying the health care account. The server device may use that metadata to determine which data includes or references the health care account. Accordingly, a subset of the events may be identified being associated with data that includes or references the one or more filtering parameters.

At block 536, if the data includes user dispositions, then the user dispositions are aggregated and a satisfaction rating can be determined based on the aggregation. The user dispositions can be represented by numerical values. The metadata can describe the range of numerical values for normalizing diverse scales. For example, values between −100% and 100% may be normalized to a scale between −1 and 1, with zero being neutral. In some implementations, the user dispositions can be words such as "good", "bad", or "average," where the words can be assigned to numerical values. In some implementations, the aggregated numerical values can be weighted, such that certain events may be weighted with greater importance over other events. Moreover, the half-life of an event may cause some events to be half as relevant as it was X days ago, logarithmically.

At block 536, a timeline regarding the database record is provided by the server device using the data. Once data is identified regarding events associated with data objects that have a hierarchical relationship with a database record, once the data is determined to include or reference the database record, and once the data is determined to satisfy the filtering parameters, a timeline can be constructed by the server device using such data. The server device can use such data to send to the user device so that the timeline can be displayed.

At block 540, a timeline of the events is displayed in a user interface of the user device according to the timestamps of the events and according to satisfaction of the filtering parameters. The timeline can further include the satisfaction rating from the aggregated user dispositions. The events satisfying the filtering parameters can constitute the identified subset of events having data that includes or references the filtering parameters. The timeline arranges the events chronologically across a dimension of time. The data associated with the events can be displayed partially or fully in the timeline. When a user hovers over or selects any of the events in the timeline, more of the data associated with the event may be displayed in a visual component, such as in a pop-up window. In some implementations, the data can include a user disposition or sentiment regarding the event. The user dispositions or sentiments regarding the events displayed in the timeline can be aggregated so that an overall satisfaction rating or health-based numeric can be calculated.

A timeline in an on-demand database service can make use of data in a cloud-based environment and metadata stored in association with events in a database system. The timeline can be constructed to organize events or interactions related to a database record in the database system that can paint a picture of the database system quickly and accurately. With filtering parameters that use the metadata in the database system, different useful arrangements and displays of events on the timeline can be provided using the filtering parameters.

In one example, a timeline in the health care industry can be created. A timeline for a patient record may show events for prescription renewals, prescription expirations, medical visits, procedures, lab tests, radiology tests, and more. The events can be plotted out on a timeline so that all of the patient's health events can be arranged chronologically. Visual correlations can be provided to show any negative patient outcomes tied to certain patient care events. This can be useful for a doctor or nurse getting up to speed on a patient record.

In another example, a timeline in the legal industry can be created. A timeline can show events and transactions for a securities firm. A timeline can show events and transactions when securities were sold, when documents were shared, when phone calls were made, and when other interactions with customers occurred.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
    a database system implemented using a server system comprising one or more hardware processors, the database system configurable to cause:
        displaying, in a user interface on a display device, a plurality of filtering parameters in association with a first database record stored in a database and identified in the user interface,
        obtaining, via the user interface, first user input selecting a first subset of the filtering parameters, the first subset of filtering parameters identifying one or more of a plurality of event types of events and identifying one or more of a plurality of customer relationship management (CRM) types of database records,
        identifying one or more of a plurality of events associated with the first database record as being of the identified one or more event types,
        identifying one or more of a plurality of second database records associated with the first database record as being of the identified one or more CRM types,
        displaying, in the user interface on the display device, a timeline in association with the first database record, the timeline presenting the identified one or more events and the identified one or more records chronologically according to respective timestamps, the timeline graphically indicating a respective event type of each identified event and a respective CRM type of each identified record,
        obtaining, via the user interface, second user input selecting a second subset of the filtering parameters, the second subset of filtering parameters being different from the first subset of filtering parameters,
        updating the timeline, responsive to obtaining the second subset of filtering parameters, to present one or more events and one or more records satisfying the second subset of filtering parameters,
        identifying, using metadata characterizing one or more events presented in the timeline and characterizing one or more records presented in the timeline, respective user dispositions for the presented one or more events and for the presented one or more records,
        determining, using the metadata, a numerical range for the identified user dispositions,
        determining, based on the identified user dispositions, a health-based numeric for the timeline, and
        associating the health-based numeric for the timeline with the first database record.

2. The system of claim 1, the database system further configurable to cause:
    retrieving metadata stored in association with the identified one or more events, the metadata identifying for each event one or more of: a title, an object type, an object ID, a source, a description, a priority, a timestamp, or a user disposition.

3. The system of claim 1, wherein:
    the second database records comprise data identifying a record identification (ID) of the first database record.

4. The system of claim 1, the database system further configurable to cause:
aggregating, using the metadata, user-defined characteristics identifying the user dispositions, wherein the health-based numeric is determined based on the aggregation.

5. The system of claim 4, wherein aggregating the user-defined characteristics comprises:
normalizing the user-defined characteristics,
weighting one or more data items associated with the identified one or more events and associated with the identified one or more records to produce the health-based numeric, and
applying the health-based numeric to the normalized user-defined characteristics.

6. The system of claim 1, wherein a filtering parameter indicates a hierarchical relationship with the first database record.

7. The system of claim 1, wherein the identified one or more records comprises one or more of: cases, accounts, contacts, leads, opportunities, contracts, campaigns, tasks, or work orders.

8. The system of claim 1, wherein the identified one or more events comprises one or more of: emails, activities, attachments, social networking posts, social networking comments, or online chats.

9. A computer-implemented method comprising:
causing display, in a user interface on a display device, of a plurality of filtering parameters in association with a first database record stored in a database and identified in the user interface;
obtaining, via the user interface, first user input selecting a first subset of the filtering parameters, the first subset of filtering parameters identifying one or more of a plurality of event types of events and identifying one or more of a plurality of customer relationship management (CRM) types of database records;
identifying one or more of a plurality of events associated with the first database record as being of the identified one or more event types;
identifying one or more of a plurality of second database records associated with the first database record as being of the identified one or more CRM types;
causing display, in the user interface on the display device, of a timeline in association with the first database record, the presenting the identified one or more events and the identified one or more records chronologically according to respective timestamps, the timeline graphically indicating a respective event type of each identified event and a respective CRM type of each identified record;
obtaining, via the user interface, second user input selecting a second subset of the filtering parameters, the second subset of filtering parameters being different from the first subset of filtering parameters;
causing updating of the timeline, responsive to obtaining the second subset of filtering parameters, to present one or more events and one or more records satisfying the second subset of filtering parameters;
identifying, using metadata characterizing one or more events presented in the timeline and characterizing one or more records presented in the timeline, respective user dispositions for the presented one or more events and for the presented one or more records,
determining, using the metadata, a numerical range for the identified user dispositions,
determining, based on the identified user dispositions, a health-based numeric for the timeline, and
associating the health-based numeric for the timeline with the first database record.

10. The method of claim 9, further comprising:
retrieving metadata stored in association with the identified one or more events, the metadata identifying for each event one or more of: a title, an object type, an object ID, a source, a description, a priority, a timestamp, or a user disposition.

11. The method of claim 9, further comprising:
aggregating, using the metadata, user-defined characteristics identifying the user dispositions, wherein the health-based numeric is determined based on the aggregation.

12. The method of claim 9, wherein:
a filtering parameter indicates a hierarchical relationship with the first database record.

13. A computer program product comprising computer-readable program code to be executed by one or more processors when retrieved from a non-transitory computer-readable medium, the program code comprising instructions configurable to cause:
displaying, in a user interface on a display device, a plurality of filtering parameters in association with a first database record stored in a database and identified in the user interface,
obtaining, via the user interface, first user input selecting a first subset of the filtering parameters, the first subset of filtering parameters identifying one or more of a plurality of event types of events and identifying one or more of a plurality of customer relationship management (CRM) types of database records,
identifying one or more of a plurality of events associated with the first database record as being of the identified one or more event types,
identifying one or more of a plurality of second database records associated with the first database record as being of the identified one or more CRM types,
displaying, in the user interface on the display device, a timeline in association with the first database record, the timeline presenting the identified one or more events and the identified one or more records chronologically according to respective timestamps, the timeline graphically indicating a respective event type of each identified event and a respective CRM type of each identified record,
obtaining, via the user interface, second user input selecting a second subset of the filtering parameters, the second subset of filtering parameters being different from the first subset of filtering parameters,
updating the timeline, responsive to obtaining the second subset of filtering parameters, to present one or more events and one or more records satisfying the second subset of filtering parameters,
identifying, using metadata characterizing one or more events presented in the timeline and characterizing one or more records presented in the timeline, respective user dispositions for the presented one or more events and for the presented one or more records,
determining, using the metadata, a numerical range for the identified user dispositions,
determining, based on the identified user dispositions, a health-based numeric for the timeline, and
associating the health-based numeric for the timeline with the first database record.

14. The computer program product of claim 13, the instructions further configurable to cause:

retrieving metadata stored in association with the identified one or more events, the metadata identifying for each event one or more of: a title, an object type, an object ID, a source, a description, a priority, a timestamp, or a user disposition.

15. The computer program product of claim 13, the instructions further configurable to cause:

aggregating, using the metadata, user-defined characteristics identifying the user dispositions, wherein the health-based numeric is determined based on the aggregation.

16. The computer program product of claim 13, wherein a filtering parameter indicates a hierarchical relationship with the first database record.

* * * * *